No. 727,254. PATENTED MAY 5, 1903.
H. ARIENS & J. THOMPSON.
PULVERIZER.
APPLICATION FILED FEB. 8, 1902.
NO MODEL. 2 SHEETS—SHEET 1.

Witnesses:
Geo. W. Young,
Rob Lee Young

Inventors:
Henry Ariens,
John Thompson.
By H. G. Underwood
Attorneys

No. 727,254. PATENTED MAY 5, 1903.
H. ARIENS & J. THOMPSON.
PULVERIZER.
APPLICATION FILED FEB. 8, 1902.
NO MODEL. 2 SHEETS—SHEET 2.

Witnesses
Leo. W. Young,
Rob Lee Young.

Inventors:
Henry Ariens,
John Thompson,
By H. G. Underwood
Attorney

No. 727,254. Patented May 5, 1903.

UNITED STATES PATENT OFFICE.

HENRY ARIENS AND JOHN THOMPSON, OF BRILLION, WISCONSIN, ASSIGNORS TO BRILLION IRON WORKS, OF BRILLION, WISCONSIN.

PULVERIZER.

SPECIFICATION forming part of Letters Patent No. 727,254, dated May 5, 1903.

Application filed February 8, 1902. Serial No. 93,205. (No model.)

*To all whom it may concern:*

Be it known that we, HENRY ARIENS and JOHN THOMPSON, citizens of the United States, and residents of Brillion, in the county of Calumet and State of Wisconsin, have invented certain new and useful Improvements in Pulverizers; and we do hereby declare that the following is a full, clear, and exact description thereof.
Our invention relates to devices for pulverizing the earth in preparing the same for planting; and it consists in certain peculiarities of construction and combination of parts, as will be fully set forth hereinafter in connection with the accompanying drawings, and subsequently claimed, the present application being for a device precisely like that shown in our earlier application for patent, filed July 5, 1901, under Serial No. 67,142, (and now Patent No. 695,024, dated March 11, 1902,) except that the transverse cutting edges of our said earlier case are here omitted, as the disks thus constructed are therein claimed, and this application being for the other novel features shown in said earlier application (and patent) which were divided out of that case, but specifically reserved as the subject of this present application.

Figure 1:
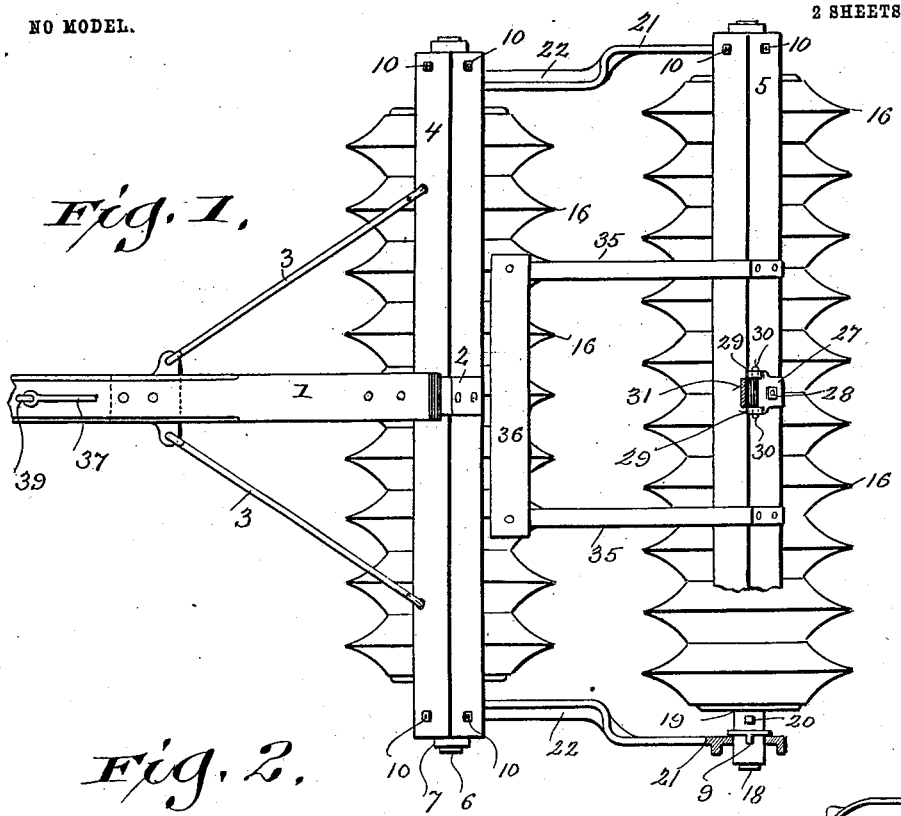
Figure 2:
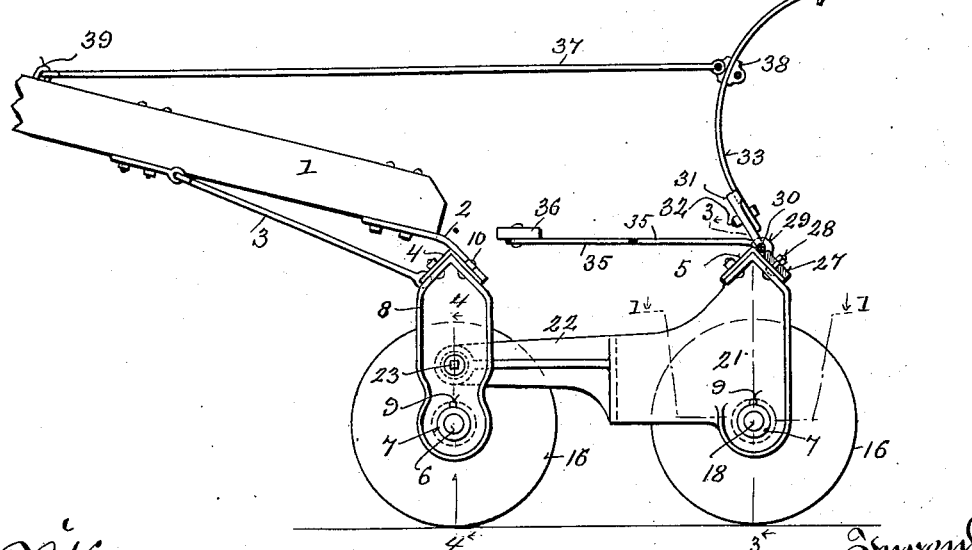
Figure 3:
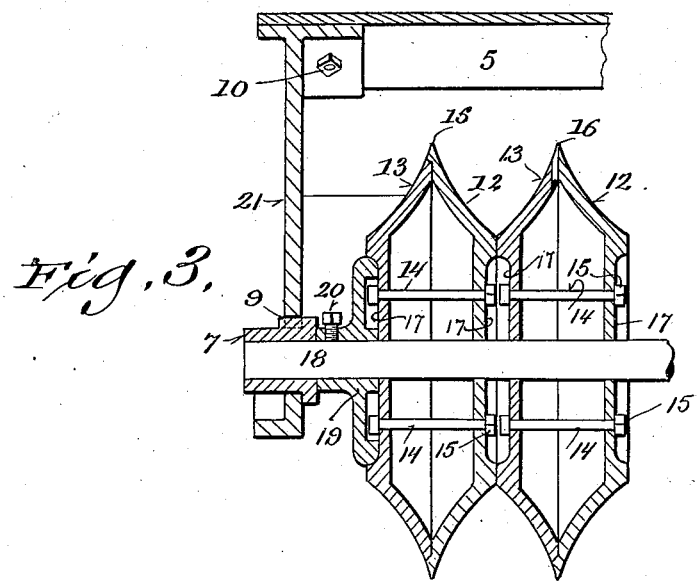
Figure 4:
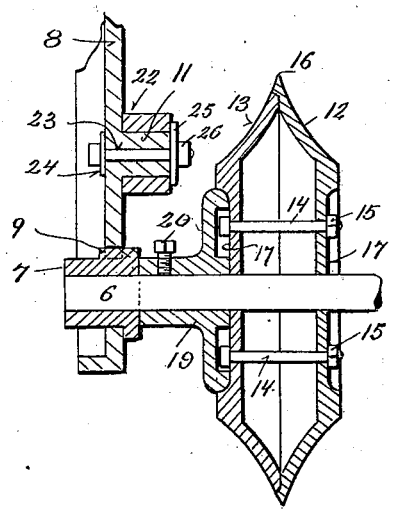

In the said drawings, Figure 1 is a plan view of our said device, partly in section on the line 1 1 of Fig. 2 and with the seat-support socket also in section and the seat consequently not shown and with the front end of the tongue and one end of the rear cross-bar broken away. Fig. 2 is a side elevation of the said device, also partly broken away and in section. Figs. 3 and 4 are vertical sectional views taken, respectively, on the planes indicated by the lines 3 3 and 4 4 in Fig. 2 and drawn to an enlarged scale.

As in our said earlier application hereinbefore referred to, our pulverizer consists, primarily, of a front and rear row of disks, each row being supported by a transverse axle in suitable end frames and with the front and rear frames pivotally connected together, the disks being so disposed that the cutting edges of those in one row alternate in line with those in the other row of disks, so that each row has independent action and adapted to operate at different planes, the disks in the present case, however, having different cutting edges from those shown, described, and claimed in the said earlier application.

Referring to the drawings, the numeral 1 represents the tongue or pole of our pulverizer secured by strap 2 and brace-rods 3 3 to the front cross-bar 4 of our device, which in its preferred form herein illustrated consists of an iron angle-plate. The rear cross-bar 5 is of similar construction. The front axle 6 is supported in suitable boxes 7, which are themselves supported by the uprights 8 of the front frames and kept from rotating with the axle by means of feathers 9, fitting within recesses in the said uprights, the front cross-bar 4 extending across from one front upright to the other and being secured at its ends thereto by bolts 10 10, as shown. The uprights 8 are formed with holes above the plane of the boxes 7, with hollow communicating inward-extending studs 11 for connection to the rear end frames of the pulverizers, as hereinafter described.

The pulverizer-disks are each composed of two hollow sections 12 13, secured together by bolts 14 and nuts 15, and the said disks as thus completed present only a single sharp annular central cutting edge 16, which forms an integral part of the section 12, the other section 13 being of less diameter and fitting against the section 12, as shown in Figs. 3 and 4. The said disks are all made straight and vertical on their outer sides, so as to be closely assembled together on their axles, these said outer faces each having a central circular depression 17 therein, which affords room for the heads of the bolts 14 and securing-nuts 15, so that the successive disks can come closely together, as best shown in Fig. 3, (where the rear axle is shown marked 18,) the said circular depression 17 also receiving at each end of each row of disks the sleeved bearings 19, whose hubs abut against the inner ends of the described boxes 7 and which bearings are secured to the axles 6 and 18 by setscrews 20 (the boxes and bearings for both the front and rear axles having the same reference-numerals) and the boxes 7 at the rear being supported by and within the uprights 21 of the rear frame in precisely the same manner as the front braces are supported by and within the front frame-uprights 8. The rear uprights 21 have forward-extending arms 22, whose front ends are formed with bores therethrough to engage with the hereinbefore-named inward-projecting studs 11 of the front uprights 8, to which they are secured by the pivot-bolt 23 and suitable washers 24 25 and nuts 26, as best shown in Fig. 4.

The rear cross-bar 5 is secured to the rear uprights 21 by bolts 10 and nuts just as the front cross-bar is secured to the front uprights. The said rear cross-bar 5 at its center is provided with a block 27, bolted thereto, as shown at 28, and having curved fingers 29 29, which receive and inclose trunnions 30 30, projecting laterally from the lower end of a flanged socket-plate 31, to which is bolted, as shown at 32, the lower end of a backwardly-curved seat-support 33, which carries at its free upper end a seat 34, and on each side of the said seat-support 33 other spring-supports 35 35 are bolted at their rear ends to the said rear cross-bar 5 and project forward to receive a transverse foot-rest 36. A brace-rod 37 extends between a clip 38 on the seat-support 33 and a staple 39 on the tongue or pole 1, whereby the seat 34 is kept in proper position irrespective of the elevation or depression of the rear frame and row of disks at any time, the flanged socket-plate 31 rocking on the trunnions 30 30 with each change of elevation of the said rear frame or of the tongue or pole, and thereby adding to the comfort of the driver.

Having thus described our invention, what we claim as new, and desire to secure by Letters Patent, is—

1. In a pulverizer, the combination of front and rear end frames jointed together so as to have independent vertical movement, and united by front and rear axles carrying cutting-disks, of front and rear cross-bars, rigidly uniting their respective end frames, above the plane of the said disks; a backwardly-curved seat-support, having a rocking connection, at its lower end, with said rear cross-bar, and carrying a seat at its free upper end; a tongue secured to the said front cross-bar; and a brace-rod, clipped to said seat-support, at a point intermediate of the ends of the latter, and extending forward and loosely connected to said tongue.

2. In a pulverizer, pairs of front and rear end frames, each pair united by an upper cross-bar, and each end frame comprising an upright with a box rigidly supported thereby, in combination with transverse front and rear axles, journaled in said boxes, and carrying cutting-disks, the uprights of the front end frames having inward-extending studs, and the uprights of the rear end frames having forwardly-extending arms, whose front ends are formed with bores therethrough for the reception of the said studs on the front uprights, and means for securing the said studs and arms in pivotal engagement.

3. The combination with pairs of front and rear end frames, each pair united by an upper cross-bar and each end frame comprising an upright with a box rigidly supported thereby, of transverse front and rear axles, journaled in said boxes, the uprights of the front end frames, having perforations therethrough and inward-extending hollow studs in line with said perforations, and the uprights of the rear end frames having forwardly-extending arms, whose front ends are formed with bores therethrough for the reception of the said studs on the front uprights, and pivot-bolts extending through the said front uprights and their said hollow studs and through the bores in said arms.

In testimony that we claim the foregoing we have hereunto set our hands, at Brillion, in the county of Calumet and State of Wisconsin, in the presence of two witnesses.

HENRY ARIENS.
JOHN THOMPSON.

Witnesses:
W. V. McMULLEN,
MARK P. OHLSEN.